United States Patent
Bensakhria et al.

(10) Patent No.: US 9,340,735 B2
(45) Date of Patent: May 17, 2016

(54) METHOD AND SYSTEM FOR PRODUCING HYDROGEN FROM CARBON-CONTAINING RAW MATERIALS

(75) Inventors: Ammar Bensakhria, Thourotte (FR); Raymond François Guyomarc'h, Caussade (FR)

(73) Assignee: SEE—Soluções, Energia e Meio Ambiente Ltda., São Paulo-SP (BR)

( * ) Notice: Subject to any disclaimer, the term of this patent is extended or adjusted under 35 U.S.C. 154(b) by 0 days.

(21) Appl. No.: 13/576,638

(22) PCT Filed: Jan. 17, 2011

(86) PCT No.: PCT/BR2011/000020
§ 371 (c)(1), (2), (4) Date: Aug. 1, 2012

(87) PCT Pub. No.: WO2011/091496
PCT Pub. Date: Aug. 4, 2011

(65) Prior Publication Data
US 2012/0301949 A1 Nov. 29, 2012

(30) Foreign Application Priority Data
Feb. 1, 2010 (FR) .................................... 10 00379

(51) Int. Cl.
*C10J 3/00* (2006.01)
*C10K 3/00* (2006.01)
*C01B 3/06* (2006.01)

(52) U.S. Cl.
CPC . *C10J 3/00* (2013.01); *C01B 3/063* (2013.01); *C10K 3/00* (2013.01); *C10K 3/006* (2013.01);
(Continued)

(58) Field of Classification Search
CPC ............ C10J 3/00; C10K 3/006; C10K 3/00; C01B 3/063

USPC ....................................................... 48/197 R
See application file for complete search history.

(56) References Cited

U.S. PATENT DOCUMENTS

| 1,163,922 | A | 12/1915 | Hillhouse |
| 2,128,262 | A | 8/1938 | Newman |

(Continued)

FOREIGN PATENT DOCUMENTS

| EP | 1 136 542 A1 | 9/2001 |
| EP | 1 933 087 A2 | 6/2008 |

(Continued)

OTHER PUBLICATIONS

Kong L et al, Hydrogen Production from Biomass Wastes by Hydrothermal Gasification, Energy Sources, Part A, 30: 1166-1178, 2008.*

(Continued)

*Primary Examiner* — Matthew Merkling
(74) *Attorney, Agent, or Firm* — Volpe and Koenig, P.C.

(57) ABSTRACT

The invention refers to a process to produce $H_2$ from biomass containing carbon. The biomass is gasified to obtain a gaseous flow essentially containing molecules of carbon monoxide (CO) and molecules of molecular hydrogen ($H_2$). These molecules (CO) and ($H_2$) are then oxidized by oxygen holders in oxidized state (MeO) to obtain a gaseous flow essentially containing $CO_2$ and water steam ($H_2O_{steam}$) and oxygen holders in reduced state (Me). The oxygen holders are then oxidized by water steam. That oxidation produces oxidized oxygen holders and a gaseous flow essentially containing di-hydrogen ($H_2$). The invention also refers to a system containing the means to perform the steps of such a process.

8 Claims, 2 Drawing Sheets

Figure 1:
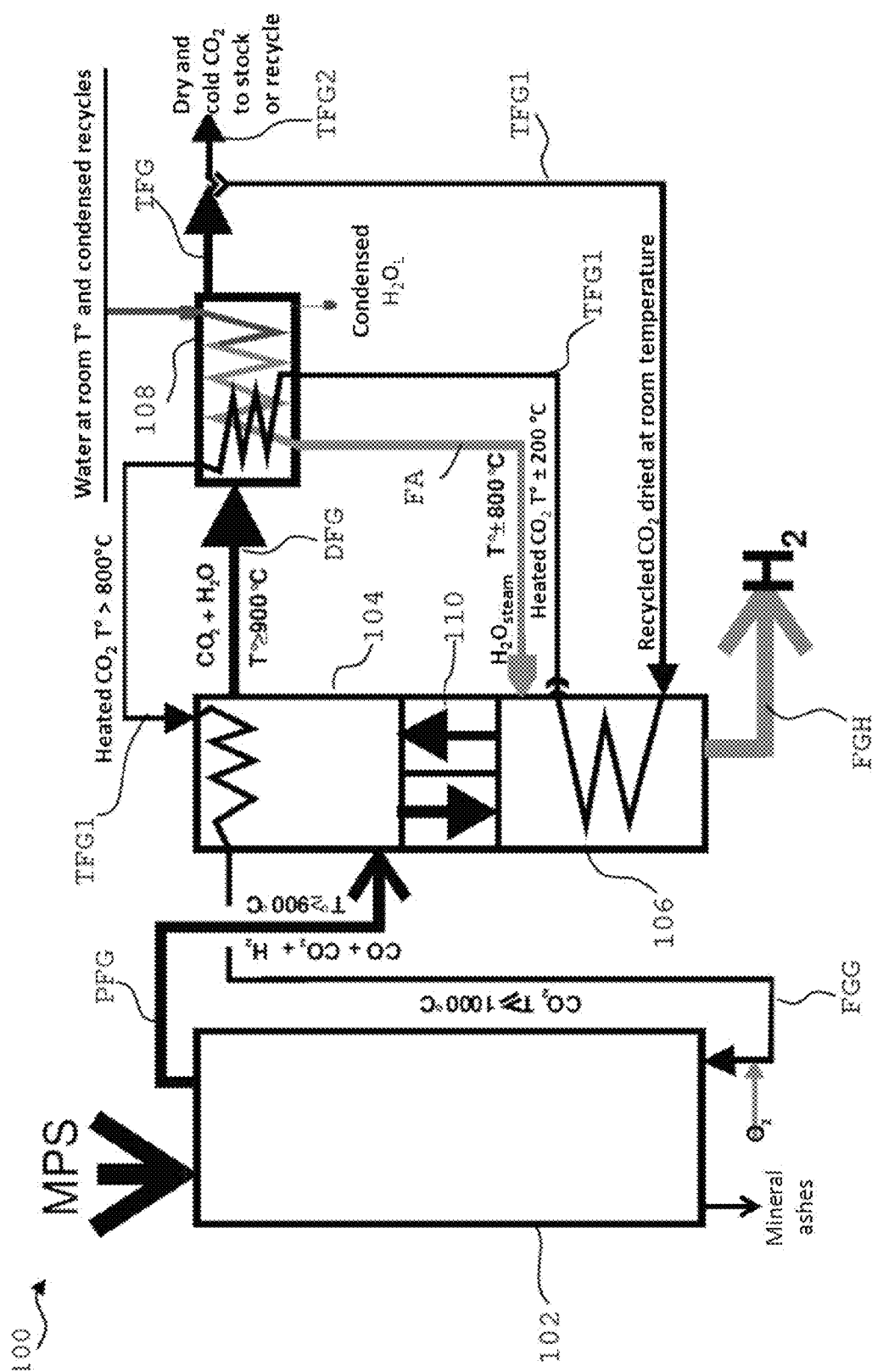

(52) U.S. Cl.
CPC .. *C10J 2300/0969* (2013.01); *C10J 2300/0996* (2013.01); *C10J 2300/1681* (2013.01); *C10J 2300/1807* (2013.01); *C10J 2300/1815* (2013.01); *Y02E 60/36* (2013.01)

(56) References Cited

U.S. PATENT DOCUMENTS

| | | | |
|---|---|---|---|
| 2,602,809 A | | 7/1952 | Dickinson |
| 2,656,255 A | * | 10/1953 | Johnson ..................... 423/656 |
| 2,772,954 A | * | 12/1956 | Jequier ........................ 48/202 |
| 2,864,688 A | | 12/1958 | Reed |
| 3,031,287 A | * | 4/1962 | Benson et al. ............. 48/197 R |
| 3,201,215 A | | 8/1965 | Negra et al. |
| 3,442,620 A | * | 5/1969 | Schora, Jr. et al. .......... 423/658 |
| 3,915,840 A | | 10/1975 | Gladrow et al. |
| 4,040,976 A | | 8/1977 | Greene |
| 4,070,160 A | | 1/1978 | Cottle |
| 4,265,868 A | | 5/1981 | Kamody |
| 4,272,555 A | | 6/1981 | Davis et al. |
| 4,343,624 A | | 8/1982 | Belke et al. |
| 4,382,915 A | | 5/1983 | Sadhukhan et al. |
| 4,725,381 A | | 2/1988 | Pinto |
| 5,213,587 A | | 5/1993 | Ekstrom et al. |
| 6,444,179 B1 | | 9/2002 | Sederquist |
| 6,648,949 B1 | | 11/2003 | Der et al. |
| 7,494,574 B2 | | 2/2009 | Kong et al. |
| 7,780,749 B2 | | 8/2010 | Kulkarni et al. |
| 2002/0127178 A1 | | 9/2002 | Kindig et al. |
| 2004/0009378 A1 | | 1/2004 | Lightner |
| 2004/0123601 A1 | * | 7/2004 | Fan ................................. 60/781 |
| 2005/0175533 A1 | | 8/2005 | Thomas |
| 2006/0130401 A1 | | 6/2006 | Giglio et al. |
| 2008/0078122 A1 | | 4/2008 | Clark |
| 2008/0134579 A1 | | 6/2008 | Kulkarni et al. |
| 2008/0184621 A1 | | 8/2008 | Clark |
| 2009/0049748 A1 | | 2/2009 | Day et al. |
| 2009/0126271 A1 | | 5/2009 | Kyo et al. |
| 2009/0148927 A1 | * | 6/2009 | Schroeder et al. ......... 435/257.1 |
| 2009/0211444 A1 | | 8/2009 | Lissianski et al. |
| 2010/0132633 A1 | | 6/2010 | Liu et al. |
| 2010/0293845 A1 | | 11/2010 | Zeman et al. |
| 2011/0303875 A1 | | 12/2011 | Hoteit et al. |
| 2012/0171588 A1 | | 7/2012 | Fan et al. |

FOREIGN PATENT DOCUMENTS

| | | |
|---|---|---|
| GB | 521415 | 5/1940 |
| GB | 757 333 A | 9/1956 |
| GB | 757333 | 9/1956 |
| GB | 2 125 430 A | 3/1984 |
| JP | H06 319520 A | 11/1994 |
| JP | H10 259384 A | 9/1998 |
| JP | 2002 173301 A | 6/2002 |
| JP | 2006 008872 A | 1/2006 |
| JP | 2009 242248 A | 10/2009 |
| WO | 01/68789 A1 | 9/2001 |
| WO | 2004067933 | 8/2004 |
| WO | 2005/003632 A1 | 1/2005 |
| WO | 2007/082089 A2 | 7/2007 |
| WO | 2008/036902 A2 | 3/2008 |
| WO | 2008097691 | 8/2008 |
| WO | 2009/055829 A1 | 4/2009 |

OTHER PUBLICATIONS

"A French-English Dictionary for Chemists", Austin M. Patterson, pp. 66-67, John Wiley and Sons,1954.*

Centi et al., "Opportunities and prospects in the chemical recycling of carbon dioxide to fuels," Catalyst Today (2009) 148:191-205.

Mimori et al., "A New Reversible Chemical System for Efficient Utilization of Carbonaceous Compounds," Energy vol. 19, No. 7, pp. 771-778, 1994.

Rezvani et al., "Comparative assessment of coal fired IGCC systems with CO2 capture using physical absorption, membrane reactors and chemical looping," Fuel 88 (2009) 2463-2472.

Li et al., "Clean coal conversion processes—progress and challenges," Energy & Environmental Science, 2008, 1, 248-267.

* cited by examiner

METHOD AND SYSTEM FOR PRODUCING HYDROGEN FROM CARBON-CONTAINING RAW MATERIALS

This application is a 35 U.S.C. §371 national phase application of PCT/BR2011/000020, which was filed Jan. 17, 2011 and is incorporated herein by reference as if fully set forth.

The invention refers to a process for the production of hydrogen. It also refers to a system to put that procedure into practice.

The scope of the invention is the scope of generation of hydrogen from a raw material containing carbon and water steam.

The production of hydrogen by reforming water steam over a raw material containing carbon is perfectly known and coded by the different producers in the industry and is called steam reforming.

The most widely used steam reforming is currently methane steam reforming: $CH_4 + 2H_2O \rightarrow CO_2 + 4 H_2$. These reactions consume thermal power and reject fatal $CO_2$ (coming from the materials containing fossil carbons). They are produced in multiple stages at 800/900° C. and at pressures of 3.0/3.5 MPa over catalysts. Thermochemical reactions produced during steam reforming are globally endothermal (165 kJ/mole of $CH_4$) and the heating power of one mole of $CH_4$ is 804 kJ/mole.

The most widely used catalysts for steam reforming are based on nickel and are much sensitive to sulfur contaminating the catalyst at contents of 0.1 ppm of sulfur or higher. Other catalysts based on iron oxides ($Fe_3O_4$), based on chrome oxides ($Cr_2O_3$), based on copper oxides and chrome and zinc oxides over alumina are also used in these scale reactions. Hydrogen production systems (as disclosed below and electrolytic processes) are very expensive in technical and energetic resources. Thermal and electrical energies as required for the existing hydrogen production systems are supplied by means known as "thermoelectric external means". These treatment processes and systems depend on the external supply of process energies.

They are also industrial systems producing high negative impact over the environment, especially concerning the "carbon" impact due to $CO_2$ rejects imputable to the consumed energies and to the process itself.

An object of the present invention is to avoid the inveniences as mentioned above.

Another object of the present invention is to propose a process and a system to produce hydrogen with less power consumption.

Another object of the invention is to propose an autonomous production system for hydrogen, releasing the hydrogen production system from the dependence on continued external supplies.

Another object of the invention is to propose a hydrogen production system and process with low impact over the environment.

The invention enables to reach the above mentioned objects by means of a process to produce hydrogen from dry raw material, said process comprising at least one iteration of the following steps:

gasification in a first so-called gasification reactor of dry material containing carbon with a gaseous flow of gasification containing $CO_2$ at high temperature and oxygen, said gasification supplying a first gaseous flow essentially containing molecules of carbon monoxide (CO) and eventually di-hydrogen ($H_2$) molecules, as well as eventually water steam ($H_2O_{steam}$);

oxidation, in a second so-called oxidation reactor, by oxygen holders in oxidized state (MeO) and a gaseous flow containing oxygen, said molecules of carbon monoxide (CO) and di-hydrogen molecules ($H_2$) present in said first gaseous flow, said oxidation supplying a second gaseous flow at high temperature containing $CO_2$, oxygen holders in reduced state (Me) and eventually water steam ($H_2O_{steam}$) proportionally to hydrogen contained in the chemical formulation of said dry raw material containing carbon;

activation within a third so-called activation reactor of said holders of oxygen in reduced state with a gaseous flow of activation essentially containing water steam, said activation supplying holders of oxygen in oxidized state, a third gaseous flow containing di-hydrogen ($H_2$) and an excess of thermal power.

The essential part of the gasification of the dry material containing carbon in the first reactor is performed as long as said dry material containing carbon includes (in its chemical composition) molecular oxygen or not, in two distinct and simultaneous steps.

If said dry material containing carbon (MPCS) contains molecular oxygen in its chemical composition, gasification occurs in two simultaneous steps:

the pyrolytic action firstly occurs in the core of the material, by means of intense thermal supply, by the heating gas essentially comprising $CO_2$. Such pyrolysis decomposes molecules of said dry raw material containing carbon (MPCS) and makes the primary gasification of molecular carbon by composition between the C and the molecular oxygen $\frac{1}{2}O_2$ to obtain CO. Said decomposition releases (eventual) molecular hydrogen from the chemical composition of the material, and carbons not having their equivalent gasification "oxygen" in matrix molecules remain.

These carbons will then react over heating $CO_2$, which will be reduced by capturing $\frac{1}{2}O_2$ as required to enter the gaseous phase. This reaction converts as many $CO_2$ molecules in CO as C molecules in CO according to Boudouard balances at the temperature of 1000° C.

If said dry material containing carbon (MPCS) does not have other molecular oxygens in its chemical composition, gasification occurs in one single step:

initially, the increase in the temperature of said dry material containing carbon (MPCS) by intense thermal supply to the core of the material by the heating gas essentially comprising $CO_2$, so that (as long as said temperature reaches the reaction plateau from 500° C. until the conclusion at 1000° C.) carbons react with the heater as per Boudouard balances. Said reaction converts (reduces) to CO a $CO_2$ molecule exchanging an atom of oxygen with an atom of carbon (C) of said dry raw material containing carbon, to gasify that organic and/or amorphous carbon into CO with no external supply of pure oxygen.

The raw material containing carbon may be any material containing a carbon rate which can be explored in its chemical composition. The yield of the process is relative to the rate of that element by unit of matter, as well as the hydrogen content of its composition.

The process of the invention no longer requires a continued power supply from an external source of power. The only external power as consumed by the process of the invention is the eventual thermal power required to start the gasification step in the start of the process. Once the gasification is started, the process of the invention generates sufficient thermal power (which is mostly recovered by the active flows of the process of the invention) to perform the set of steps of the process and the global operation of the system.

Therefore, as we will detail below in the description, the available power for the thermal capacity of the second gaseous flow (and eventually by complementing the thermal power as generated by the forced oxidation of a part of the dry raw material containing carbon), as well as by the excess of thermal power as supplied: by oxidation of the synthesis gas (from the gasification of said dry raw material containing carbon) in the second so-called oxidation reactor and by activating the oxygen holders MeO (by reducing $H_2O$ in $H_2$), is sufficient to supply the thermal treatment system with thermal power, is sufficient to bring the gaseous flow of gasification to the gasification temperature and is sufficient to produce the water steam as required for the desired production of hydrogen, so to perform a new gasification step and, therefore, a new iteration of the steps of the process.

Therefore, the invention allows the production of hydrogen from carbon-containing raw material, more specifically biomass, with higher yielding than the processes and system of the current state of the art, with no negative impact for the environment and, in this case, notably less than other known systems and processes.

The process of the invention can advantageously comprise the use of thermal power from said second gaseous flow and/or said thermal excess of said activation by the production of at least one part of said gaseous flow of activation from water.

Therefore, after the starting cycle, the process of the invention does not require an external power supply.

Advantageously, the process of the invention can, on the other hand, comprise a recovery of at least one part of the $CO_2$ as present in the second gaseous flow to compose, at least in part, the gaseous flow of gasification for the next cycle.

Therefore, the process of the invention allows to recycle the produced $CO_2$ and reduce negative impacts over the environment.

On the other hand, at least a part of the water steam as present in the second gaseous flow may be condensed and recovered to compose at least a part of the gaseous flow of activation.

Therefore, after the starting cycle, the process of the invention recycles the water coming from the molecular hydrogen component of the raw material to reduce its need for external water, as required for the production of hydrogen.

On the other hand, the process of the invention may comprise a temperature increase in the gaseous flow of gasification, with at least one part of the thermal excess of activation of oxygen holders and a part of the thermal power as generated during gasification to bring said gaseous flow of gasification to the gasification temperature for the next cycle.

All the energy required for that temperature increase can be eventually obtained with the thermal complementation as supplied by an oxygen ($O_2$) supply in the gasification reactor. This supply, on the other hand, is limited to the desired thermal requirements, each molecule of $O_2$ oxidizes two molecules of hydrogen ($H_2$) and/or atoms of C to make two $H_2O$ and/or two CO (or one and another as a function of the initial composition of raw material containing carbon), thus generating the thermal power as useful for the reactions of the process of the invention. Besides the thermal complement supplied to the process of the invention, each CO allows to generate a molecule of pure hydrogen ($H_2$).

In a very advantageous version, the process of the invention may comprise the recycling by photosynthesis of a part of the $CO_2$ as present in the second gaseous flow in a microalga culture bioreactor, said bioreactor supplying, on one hand, a gaseous oxygen flow ($O_2$) and, on the other hand, the carbon-containing biomass.

Therefore, the process of the invention allows to recycle the excess of $CO_2$ as produced by the reactions, in a photosynthetic reactor consuming the carbon and releasing the oxygen from the molecule. Therefore, in this advantageous version, the process of the invention no longer depends on a source of $O_2$ as required for any oxycombustion.

The only oxygen consumed by the process of the invention is the oxygen eventually required to start the gasification step early in the process and the oxygen for thermal complementation as required for the process.

In fact, at least a part of the gaseous flow of oxygen ($O_2$) may be used in the gasification reactor to gasify the raw material containing carbon. That oxygen then substitutes the one coming from external sources, thus reducing the economic and environmental impact of the process of the invention.

On the other hand, the process of the invention may comprise the recovery of at least one part of the biomass containing carbon to be gasified in the gasification reactor. Therefore, the process of the invention allows the production of at least a part of the biomass as consumed in the gasification reactor.

Another object of the invention proposes a system to produce hydrogen from raw material containing carbon, said system comprising:

a gasification reactor for raw material containing carbon with a gaseous flow of gasification containing $CO_2$ at high temperature and the supply of oxygen ($O_2$) allowing an eventual thermal complementation useful for the gasification reactions; said gasification reactor supplies a first gaseous flow essentially containing carbon monoxide (CO) molecules and di-hydrogen ($H_2$) molecules (molecular hydrogen contained in the chemical formulation of said dry raw material containing carbon).

a reactor for oxidation by oxygen holders in oxidized state (MeO) of said molecules of carbon monoxide (CO) and said molecules of di-hydrogen ($H_2$) as present in said first gaseous flow, said oxidation reactor supplying a second gaseous flow at high temperature containing $CO_2$ and water steam ($H_2O_g$), oxygen holders in reduced state (Me) and an excess of thermal water;

an activation reactor for said oxygen holders in reduced state with a gaseous flow of activation essentially containing water steam, said activation reactor supplying holders of oxygen in oxidized state and a third gaseous flow containing di-hydrogen ($H_2$) and an excess of thermal power.

On the other hand, the system of the invention may contain at least one thermal exchanger supplying at least a part of said gaseous flow of activation and at least a part of the thermal power of said second gaseous flow and/or said thermal excess of said activation.

Advantageously, the system of the invention can, on the other hand, contain a recycling circuit for at least a part of the $CO_2$ as present in the second gaseous flow to compose, at least in part, the gaseous flow of gasification for the next cycle.

On the other hand, the system of the invention can also comprise the recovery of at least a part of the water steam as present in the second gaseous flow to compose at least a part of the gaseous flow of activation.

In an advantageous version, the system of the invention may also comprise a microalga culture bioreactor to recycle by photosynthesis a part of the CO2 as present in the second gaseous flow, said bioreactor supplying, on one hand, a gaseous oxygen flow ($O_2$) and, on the other hand, carbon-containing biomass.

Finally, the system of the invention may comprise:

a recovery circuit for at least one part of the gaseous flow of oxygen ($O_2$) for injection in the gasification reactor to gasify the raw material containing carbon; and/or a recovery circuit for at least a part of the biomass containing carbon for gasification in the gasification reactor.

Oxygen holders may contain NiO, $Fe_2O_3$, MgO, CaO, etc.

Figure 2:
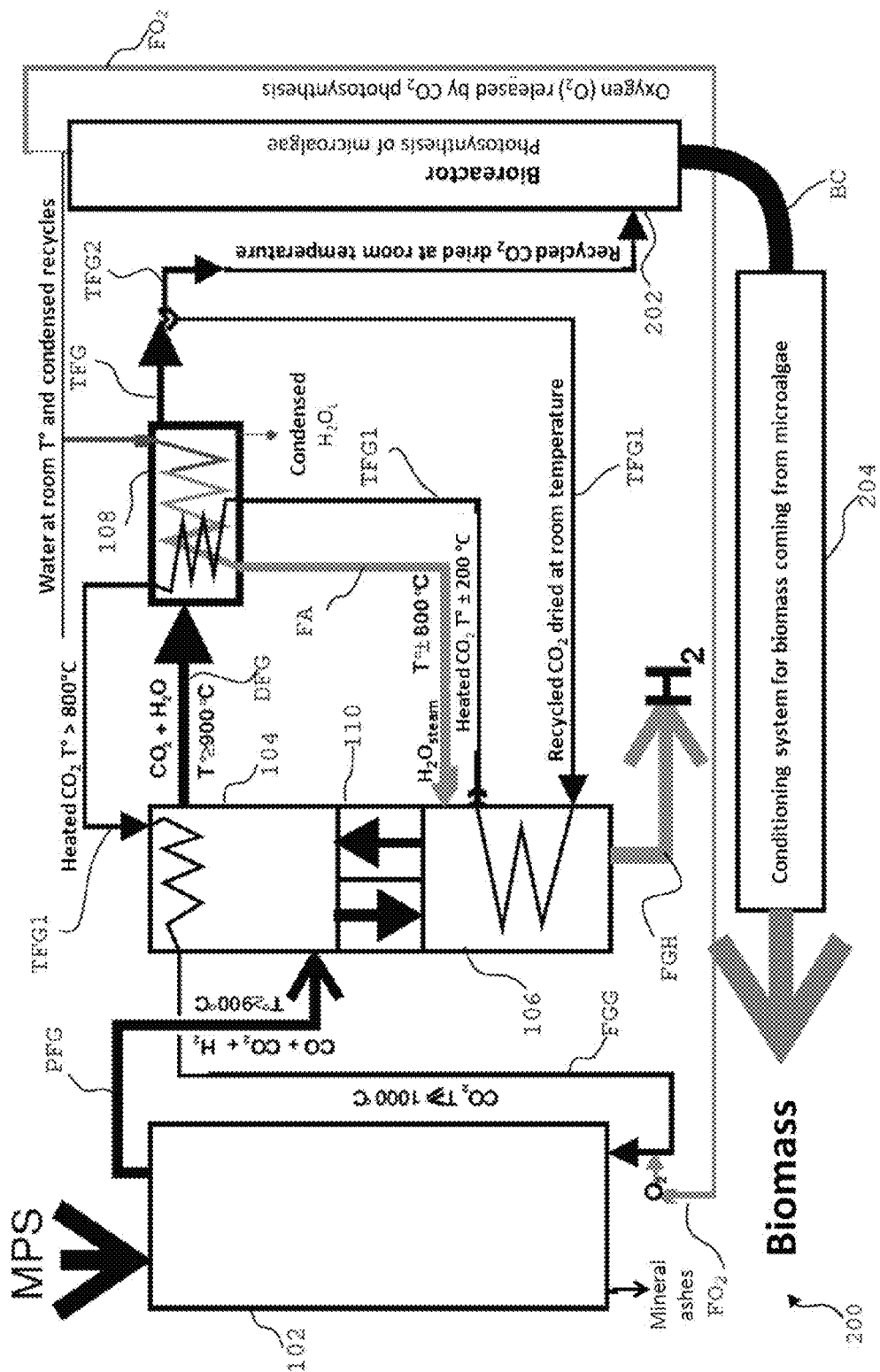

Other advantages and characteristics will appear from the analysis of the detailed description of a non-limitative way of embodiment and the attached figures:

FIG. 1 is a schematic representation of a first version of a system of the invention; and FIG. 2 is a schematic representation of a second version of a system of the invention.

In the examples, the dry material containing carbon MPCS, taken as a reference, is plant biomass. Reactions, energy transfers and thermochemical conversions are identical, no matter which is the MPCS, and only the quantitative result in produced hydrogen depends on the rate of carbon and molecular hydrogen as contained in the chemical composition of said MPCS.

According to an example of embodiment, the load of dry material containing carbon may contain:

plant or animal biomass;
coal;
peat;
lignite;
organic or non organic residues;
worn tyres; or
any combination of these carbon-containing materials.

Generally speaking, organic biomasses contain hydrogen in their molecular composition. The chemical composition of said biomasses is (in average) 50% of C, 44% of $O_2$ and 6% of $H_2$.

However, we have also found hydrogen in certain coals or other sources of amorphous carbon, as well as in certain residues containing carbon, which may be used as dry material containing carbon MPCS.

FIG. 1 is a schematic representation of a first version of a system of the invention.

The system 100 shown on FIG. 1 contains a gasification reactor 102, an oxidation reactor 104 and an activation reactor for oxygen holders 106.

The dry raw materials containing carbon MPCS are introduced in the gasification reactor 102 and subsequently flow by gravity into that reactor by means of a tubular net serving as grids (not shown) which reduce the speed of that flow.

A gaseous flow of gasification FGG essentially composed by reactive $CO_2$ and heating $CO_2$ under a temperature of 1000° C. is introduced in the gasification reactor 102 and eventually enriched by pure oxygen ($O_2$) (this supply of oxygen ($O_2$) eventually allows useful thermal complementation to the gasification reactors, temperature maintenance of the gasification reactor 102 and a thermal complementation of the gaseous flow of gasification FGG). Said gaseous flow of gasification FGG is injected in said gasification reactor in counter current from the flow of carbon-containing materials MPCS.

$CO_2$ as introduced finds the raw material containing carbon MPCS which, in this stage, has reached a temperature ≥1000° C. This pyrolytic action cracks the molecules of the dry material containing carbon MPCS. At the conversion/pyrolysis temperature of 1000/1100° C., the molecular cracking of the dry material containing carbon MPCS is athermal. The primary reaction of the meeting between the dry material containing carbon MPCS and the gaseous flow of gasification FGG is the pyrolysis/gasification of said MPCS, during which C and O of the molecular composition are combined into CO (primary phase of carbon gasification). Simultaneously, $CO_2$ conversion into CO (i.e. in thermal power) over each element of C not having equivalent molecular O is generated. This pyrolytic action is applied to every dry material containing carbon MPCS which chemical composition includes carbon and molecular oxygen. In cases where said raw material containing carbon MPCS does not contain molecular oxygen, the conversion reaction between 500° C. and 1000/1100° C. is performed.

Eventually, a thermal complement can be generated in the center of the gasification reaction by the introduction of oxygen ($O_2$) in the gaseous flow of gasification FGG. Each mole of this oxygen as introduced then oxidizes two moles of $H_2$ and/or two moles of C, generating the corresponding thermal power in the core of the gasification reactor. Said eventual complement allows to control the thermal regulation of the reactions in said gasification reactor and increase the yield of the reactions so to increase the final production of hydrogen.

According to the chemical properties of said dry material containing carbon MPCS, the result of said conversion/pyrolysis will have different composition:

if said material containing carbon is an amorphous coal which content of carbon is ≥80% and does not contain elements of molecular oxygen or hydrogen, the reaction in said gasification reactor 102 will be the conversion of $CO_2$ in CO over the carbons of said dry raw material containing carbon MPCS;

if said raw material containing carbon is an organic biomass and/or a mixture of materials and residues, which chemical composition comprises elements of molecular oxygen and elements of molecular hydrogen, the result of the reaction in said reactor 102 will be the gasification of said dry raw material containing carbon MPCS. That reaction is firstly a pyrolysis, alongside which the dry raw material containing carbon MPCS is molecularly cracked; firstly, carbons are gasified by their reaction with molecular oxygen and the release of molecular hydrogen ($H_2$). Subsequently, $CO_2$ is converted into CO over the carbons of said dry material containing carbon MPCS which do not have its equivalent in molecular oxygen to be gasified. $CO_2$ forecasted for this effect therefore supply ½$O_2$ to C to gasify them under the CO form, which are themselves converted into CO, thus in new energy. These CO, with the molecules of hydrogen ($H_2$), transfer the full power potential of the dry raw materials containing carbon MPCS to the following reactive sectors in the system 100.

Therefore, the result of the reactions differs, in said gasification reactor 102, as a function of the quality of the dry raw material containing carbon MPCS. The following demonstration takes as an example raw material organic biomass which average chemical composition is:

50% carbon: 500 grams 41.667 mol of C
44% oxygen: 440 grams 13.750 moles of $O_2$
6% hydrogen: 60 grams 29.762 moles of $H_2$ Cracking/Combination Action:

The dissociation of the raw material containing carbon MPCS, combination of C in CO and the release of $H_2$ is athermal (at the conversion/pyrolysis temperature of 1000/1100° C. of the process of the invention) and only the specific heat of said dry material containing carbon MPCS should be supplied by the gaseous flow of gasification FGG to obtain reactions.

Conversion Reaction:

From $CO_2$ to CO is endothermal, according to the reactions:

$$CO_2 - \tfrac{1}{2}O_2 = CO + O + 283 \text{ kJ/mol}$$

$$C + \tfrac{1}{2}O_2 \text{ (from } CO_2 \text{)} = CO - 111 \text{ kJ/mol}$$

i.e. a thermal deficit of 172 kJ/mol of $CO_2$.

Each one of the two molecules of CO as obtained has a heating power of 283 kJ/mol, i.e. a total 566 kJ, while the heating power of C (material containing carbon source of the primary reaction energy) is 394 kJ/mol. Under these conditions, the main object is to supply 172 kJ from the conversion endotherm by means not imputable to this power potential or by external thermal means by introducing another power which would compromise such yield. The molecular cracking of dry raw material containing carbon MPCS and the consequent gasification is athermal at the conversion/pyrolysis temperature of 1000/1100° C.; therefore, the hydrogen released during said cracking therefore does not need specific thermal supply, but at a power potential of 242 kJ/mol.

On the other hand, to increase the temperature of said dry material containing carbon MPCS and the gaseous flow of gasification FGG, "heat" thermal power is required and should be supplied by said gaseous flow of gasification FGG (complemented, be it the case, by the thermal power as generated by $H_2$ and/or C oxidation by oxygen $O_2$ as brought to the pyrolysis means, with said gaseous flow of gasification FGG, to produce useful thermal capacity).

In this example of organic materials, "biomass" as dry raw material containing carbon MPCS: for the "primary" gasification phase, each mole of C will react with ½ mol of $O_2$ coming from the molecular composition to generate one mole of CO; considering 27.5 moles of CO for 13.750 moles of $O_2$ (which are able to oxidize 27.5 moles of C into CO).

At the end of that "primary" gasification reaction, we will have:

27.5 moles of CO;
29.762 moles de $H_2$;
14.17 moles of C which do not have its equivalent O in the chemical formulation of dry material containing carbon MPCS.

To gasify these 14.17 moles of C, ½ mole of $O_2$ is required, therefore, as much $CO_2$, i.e. 14.17 moles which will be converted into CO to exchange ½ mole of $O_2$ to 14.17 moles of C, thus giving 28.34 moles of CO.

In this new step, we will have:
55.84 moles of CO, with the consequent heating power of: ×283 kJ/mol=15,802.72 kJ
29.762 moles of $H_2$, with the consequent heating power of: ×242 kJ/mol=7,202.404 kJ
i.e. an energetic power of: 23,005.124 kJ in oxidable 85.602 moles.

The required energy to take the kg of MCPS at 1100° C. is: 1,068.210 kJ; to take 14.17 moles of $CO_2$ (as required to conversion) at 1100° C., 717.930 kJ are required; to compensate the endotherm of the conversion of 14.17 moles of $CO_2$, 2,437.24 kJ are required.

I. e. a required energetic total for pyrolysis/conversion reactions of: 4,233.38 kJ per kg of dry raw material MPCS biomass.

To supply this process power, the gaseous flow of gasification FGG (which is composed, in the case of this example, of 14.17 moles of the third gaseous flow of recycled $CO_2$ TFG1 coming from the reactor 106) can be heated: by an external thermal process, using a part of the synthesis gases of the process of the invention; or by an external system using any source of energy as per the skills known by the experts in the art. In the start of the process of the invention, the system will be brought to the required temperature for the beginning of reactions by one of these means (not shown). These will subsequently supply thermal power and the reactive and heating gas useful to subsequent reactions.

In a pyrolytic means of the invention, molecular hydrogen reacts first with the available oxygen. The process of the invention (in this specific case) has 29.762 moles of $H_2$, with a heating power (once oxidized by the oxygen as injected with the gaseous flow of gasification FGG) of 242 kJ/mol for a total energy of: 7,202.404 kJ.

To obtain and/or collect the thermal capacity as required to the reactions in the gasification reactor 102, said third gaseous flow of recycled $CO_2$ TFG1 coming from the reactor 106 (to be transformed in the gaseous flow of gasification FGG, once acquired at the useful thermal capacity) circulates in a tubular network of thermal exchange. Said third gaseous flow TFG1 recovers, during this path, at least a part of the available thermal energies (generated during the reaction chain in the system), and thus acquiring a part of useful thermal capacity.

If said third gaseous flow TFG1 is composed of just 14.17 moles of $CO_2$ useful to the conversion reaction, during its transit in the exchanger 108, it is at a temperature of more than 800° C., i.e. a thermal capacity recovered of only: 574.334 kJ.

Therefore, 4,233.38–574.344=3,649.036 kJ of thermal capacity are missing for the reactions in the gasification reactor 102.

As we will see in the demonstration sequence, the power is available (as generated by the reaction chain) to supply such thermal capacity. This induces the transport of that energy from the source to the gasification reactor 102. For that, a complement of recycled $CO_2$ is required (an external supply is then useful to start the process).

To generate such thermal power, an injection of $O_2$ can be effected with a gaseous flow of gasification FGG at its inlet in reactive phase in the gasification reactor 102.

In the pyrolytic means of the invention at 1100° C., molecular hydrogen reacts initially with the available oxygen and the process of the invention (in this case) has 29.762 moles of $H_2$, with total heating power of: 7,202.404 kJ.

If this is the chosen option, 15.079 moles of hydrogen are required to produce the missing thermal capacity. Each injected mole of $O_2$ will react with two moles of hydrogen to produce two moles of $H_2O$ and 7.54 moles of $O_2$ are then required to compensate the lack of thermal capacity useful for this reaction. 14.683 moles of $H_2$ will remain to be reacted with CO to perform the sequence of the reactions leading to the production of pure hydrogen.

The third gaseous flow TFG1, circulating in the tubular network (performing the role of exchanger and grids to reduce the speed of flow of the oxidizing/deoxidizing materials) located in the reactions of oxidation 104 and reactivation 106 and the thermal exchanger 108, acquires its whole useful thermal capacity and becomes the gaseous flow of gasification FGG. It is at the reaction temperature of that pyrolysis/conversion chamber ≤1100° C. in which it is injected with the 7.54 moles of $O_2$ required for the reactions.

In this specific case, at the outlet of the gasification reactor 102, a first gaseous flow PFG is obtained (per kg of dry raw material containing carbon MPCS biomass), composed by 55.84 moles of CO+14.683 moles of $H_2$ and 15.079 moles of water steam ($H_2O_g$) at a temperature of more than 900° C. This first gaseous flow PFG is therefore eminently full of power and reactive. It allows power transfer from carbon-containing raw materials to the oxidation reactor 104, with no dissipation or losses. It is then introduced in the oxidation reactor 104, where it will be oxidized by the contact of oxygen holder materials MeO in active or oxidized state.

The active oxygen holders MeO are introduced in the oxidation reactor 104 at the level of an upper part of that reactor 104 and flow through tubular grids performing a role of thermal exchanger and grids (not shown) decelerating this flow.

Said first gaseous flow PFG coming from the gasification reactor 102 is essentially composed (as per the reference example: for 1 kg of dry raw material containing carbon (MPCS) of 55.84 moles of CO+14.683 moles of $H_2$+15.079 moles of water steam ($H_2O_g$). It is at a temperature of more than 900° C. when introduced in the oxidation reactor 104 (at the level of a lower part of that reactor 104) in counter current to the flow of oxygen holders MeO. The meeting between oxygen holders in oxidized state MeO (or active) and the first gaseous flow causes:

the oxidation of 55.84 moles of carbon monoxide CO into carbon dioxide $CO_2$. This reaction is exothermal and releases 283 kJ/mol; i.e. 15,802.72 kJ;

the oxidation of 14.683 moles of hydrogen $H_2$ in water steam ($H_2O_g$); this reaction is exothermal and releases 242 kJ/mol; i.e. 3,553.286 kJ (these 14.683 moles of water steam are added to the 15.079 moles generated by the production of thermal requirements of the gaseous flow of gasification FGG for the total 29.762 moles ($H_2O_g$) present in the raw material containing carbon MPCS biomass);

to perform said oxidations, 70.253 moles of MeO are required; the reduction of said 70.253 moles of MeO, active oxygen holders, is endothermal and absorbs 244.3 kJ/mol, i.e.: 17,228.669 kJ.

Therefore, the global reaction (II) is exothermal:

70.523MeO−70.523½$O_2$+17,228.769 kJ+ 55.84CO+14.683$H_2$+70.523½$O_2$−(15,802.72+3,553.288)→ 55.84$CO_2$+14.683$H_2O$+70.523Me=−2,127.239 kJ.

Therefore, the oxidation reactor 104 is exothermal for 2,127.239 kJ per kg of MPCS biomass, thus more than 90% (≈2,000 kJ) are recovered by the third recycled gaseous flow TFG1 and the balance is recovered in the exchanger 108.

Said oxidation reactor 104 supplies a second gaseous flow DFG at high temperature (≥900° C.) essentially comprising $CO_2$ and $H_2O$ and oxygen holders Me in reduced state (deactivated).

The oxidation reactor 104 is kept at a correct temperature level (≤1000° C.) thanks to the tubular net working as a thermal exchanger and grids, wherein the third recycled gaseous flow TFG1 circulates, exiting the activation reactor 106 where it will collect its essential thermal capacity, at the same time regulating the temperature of said oxidation reactor 104.

Therefore, this second gaseous flow DFG has an important thermal power: 3,573.083 kJ of thermal capacity+2,228.951 kJ from enthalpy of the 29.762 moles ($H_2O_g$) condensed in liquid $H_2O$, i.e.: 5,802.034 kJ. That thermal power is used in a thermal exchanger 108 to generate a gaseous flow of activation FA essentially containing water steam from liquid water.

This second gaseous flow DFG at the outlet of the thermal exchanger 108 is cold (at the temperature of the liquid water as injected in the exchanger to produce the gaseous flow of activation FA). The water steam as present in this flow is condensed and separate from the $CO_2$ existing in that flow.

At the outlet of the thermal exchanger, we will then have:
liquid water (condensed) 29.762 mol
a gaseous flow of activation FA essentially comprising water steam, 70.523 moles of $H_2O_g$ at a temperature of 800° C. and pressure of approximately 0.3 MPa;
latent heat (vaporization at 800° C.) of said gaseous flow of activation FA is 5,281.645 kJ which will be provided by the thermal exchanger 108 over 5,802.034 kJ available at the outlet of the oxidation reactor 104; there are still available: 520.389 kJ per kg of MPCS biomass;
a third gaseous flow TFG of $CO_2$ at high temperature and dry.

We will see below in the disclosure that these three products will be at least partly used in the system 100.

Oxygen holders Me in reduced state are introduced into the activation reactor 106. The transference of oxygen holders from the oxidation reactor 104 to the activation reactor 106 is performed by mechanical means 110. This transference can also be performed by gravity following the configuration of these two reactors.

Deactivated oxygen holders Me are still at high temperature of about 800° C. and are eminently reactive. In this activation reactor 106, oxygen holders in deactivated state Me are reactivated by the oxygen of the gaseous flow of activation FA, which is essentially composed of water steam $H_2O$ circulating counter current; 70.523 moles of Me react with 70.523 moles of $H_2O$ to produce 70.523 moles of $H_2$, 142.174 grams of pure hydrogen per kg of MPCS biomass which higher heating power (PCS) is ×242: 17,066.566 kJ.

The oxidation of oxygen holders Me in contact with water steam produces, on one hand, active oxygen holders MeO and, on the other hand, a gaseous flow of di-hydrogen FGH.

While the gaseous flow of activation FA is solely composed by water steam, the gaseous flow of hydrogen FGH is composed of pure hydrogen.

The final reaction (III) verified in that activation reactor 106 is exothermal and has an excess of energy according to the balance:

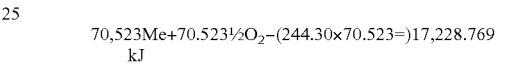

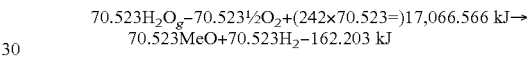

The activation reactor 106 is then exothermal of 162.203 kJ per kg of MCPS biomass which, added to the specific heat of the gaseous flow of hydrogen FGH (thermal capacity), are recovered by the third recycled gaseous flow TFG1 in the exchanger incorporated in said activation reactor 106. Said thermal capacity of said gaseous flow of hydrogen FGH at 800° C. is, for the 70.523 moles of $H_2$: 2,054.523 kJ; i.e. a total 2,216.726 kJ.

This thermal capacity is exchanged in the third recycled gaseous flow TFG1 to effect pre-heating and especially to enable the temperature reduction of the hydrogen as produced (per kg of dry raw material containing carbon PCS) at room temperature.

Therefore, this activation reactor 106 supplies:
a gaseous flow of hydrogen FGH at room temperature;
activated oxygen owners MeO at high temperature (≈600° C.); and
a thermal excess.

The reacted oxygen holders in MeO are transferred to the oxidation reactor 104 by mechanical means 110.

A part TFG1 of the third gaseous flow TFG exiting the exchanger 108 and essentially composed of $CO_2$ is recycled and used as a gaseous flow of gasification for the following cycle. The other part TFG2 of the second gaseous flow is stocked or rejected in the atmosphere.

However, this gaseous flow TFG1 is cold and should be heated for use as a gaseous flow of gasification FGG.

This gaseous flow TFG1 passes for one first time through the tubular net of the activation reactor 106, wherein it lowers the temperature of the gaseous flow of hydrogen FGH (which is composed by pure hydrogen) and where it acquires thermal capacity. It subsequently circulates in the dedicated tubular net of the thermal exchanger 108, located at the outlet of the activation reactor 106 to acquire a second part of its thermal capacity (at a temperature higher than 800° C.) thanks to the thermal excess of the oxidation reactor 520.389 kJ added to 2,216.726 kJ of the activation reactor 106, i.e. 2,737.115 kJ.

From that thermal excess, only 717.930 kJ are consumed by 14.17 moles of reactive $CO_2$ of the gaseous flow TFG1, 2,019.185 kJ are then available for the reaction chain of the process of the invention. This thermal excess is used to optimize various power transferences to the different reactions. It will be advantageously used in substitution to the thermal supply useful to the gasification reaction as supplied by the oxidation of molecular hydrogen by injected $O_2$. That substitution will allow to offer molecular hydrogen molecules for the chain reaction in the oxidation 104 and activation 106 reactors to produce the equivalent in process supplement $H_2$.

At the outlet of the activation reactor 106 and the thermal exchanger 108, a gaseous flow of $CO_2$ is obtained at a temperature of more than 800° C. To raise the temperature of that gaseous flow of $CO_2$ and obtain a gaseous flow of gasification FGG which temperature is 1000° C. or higher, the flow TFG1 passes through a thermal exchanger located in the oxidation reactor 104 where it acquires all its thermal capacity useful for the conversion over the materials containing carbon. The gaseous flow of gasification FGG as obtained at the outlet of that exchanger is then injected into the gasification reactor to gasify the dry raw material containing carbon from the next cycle.

The liquid water as obtained at the outlet of the exchanger 108 may be used to generate gaseous flow of activation FA for the following cycle.

The global remaining power is balanced and the excess of thermal power as generated along the reaction chain compensates various wastes and consumptions of the system/process of the invention.

When the process/system of the invention is started, it may be advantageously optimized by recycling the energies as generated in the reaction chain. Such optimized thermal recovery is made by using complementary heating $CO_2$, which function is to collect its thermal capacity in the non-used excess and take that thermal capacity to the core of the dry raw material containing carbon. Therefore, such optimization of non-used power recovery reduces the needs of oxygen supply and saves the equivalent amount in molecular hydrogen molecule oxidation (for the production of reaction energy). These molecules of hydrogen are therefore saved to produce moles which can be oxidized by complementary MeO producing moles of pure hydrogen at the end.

FIG. 2 is a schematic representation of a second way of embodiment of a system of the invention.

The system 200 represented by FIG. 2 comprises all the elements of the system 100 as represented by FIG. 1.

The system 200 also contains a bioreactor 202 containing microalgae.

The portion TFG2 of the third refrigerated gaseous flow TFG obtained at the outlet of the exchanger 108 is injected into the bioreactor 202. In the alga culture bioreactor 202, carbon dioxide $CO_2$ is used by photosynthesis as performed by microalgae. Photosynthesis produces, on one hand, the biomass containing carbon BC and, on the other hand, a gaseous flow of oxygen $FO_2$ by separating the carbon element "C" from the molecule of dioxygen "$O_2$".

The biomass containing carbon BC as obtained is supplied to a biomass conditioning system 204 which may be e.g. a drying system for said biomass containing carbon BC to be conditioned before its introduction in the gasification reactor 102.

The gaseous oxygen flow $FO_2$ may be supplied to the system of the invention, e.g. at the level of the gasification reactor 102 to be substituted with the oxygen used to complement thermal power useful for the gasification of carbon-containing material in the reactor 102.

Advantageously, the production of carbon-containing biomass in this second way of embodiment stimulates the global yield of the facility by:
supplying raw material with high added value (feeding/medicinal molecules omega 3, biopetroleum, etc.).
a biomass coal (pyrolysis residue of extraction of the molecules with high added value), partly feeding up the process of the invention with dry material containing carbon;
full recycling of the $CO_2$ flow TFG2, closing the gaseous circuit of the process of the invention.

Said production of carbon-containing biomass can also be fully introduced in the system/process of the invention. Thus, the circuit of raw material containing carbon is also made in closed ring and the hydrogen is continually produced with minimum impact over the environment and its resources.

In this example, carbon is oxidized by the molecule of $O_2$, thus again generating a $CO_2$ which is recycled in the same fashion. There are no atmospheric emissions or $CO_2$ sequestration to be organized.

Therefore, the process and system of the invention are independent from any external source of energy after the starting stage.

The invention is surely not limited to the examples as disclosed above.

FIG. 1
Mineral Ashes
Heated $CO_2$ T°>800° C.
Water at room T° and condensed recycles
Condensed
$H_2O_{steam}$
Heated $CO_2$ T°±200° C.
Recycled $CO_2$ dried at room temperature
Dry and cold $CO_2$ to stock or recycle
FIG. 2
Mineral Ashes
Biomass
Heated $CO_2$ T°>800° C.
$H_2O_{steam}$ T°±800° C.
Heated $CO_2$ T°±200° C.
Recycled $CO_2$ dried at room temperature
Conditioning System for Biomass Coming from Microalgae
Recycled $CO_2$ dried at room temperature
Bioreactor
Photosynthesis of Microalgae
Oxygen ($O_2$) released by $CO_2$ photosynthesis

The invention claimed is:
1. A process to produce hydrogen ($H_2$) from dry carbonaceous raw material comprising an organic biomass, said process comprising at least one iteration of the following steps:
gasification of the dry carbonaceous raw material by introducing the dry carbonaceous raw material and a gaseous flow of gasification comprising $CO_2$ at high temperature and oxygen ($O_2$) into a gasification reactor, said gasification is complete and supplies a first gaseous flow comprising 134% of molecules of carbon monoxide (CO) in comparison to the amount of carbon in said raw material, wherein the molecules of carbon monoxide (CO) are composed of 100% of carbons of said raw material plus 34% of the reconversion into CO of a part of said $CO_2$ by means of said carbonaceous raw materials, and molecules of $H_2$;
oxidation of said molecules of carbon monoxide (CO) and molecular hydrogen ($H_2$) present in said first gaseous flow by introducing said first gaseous flow and oxygen holders in an oxidized state into an oxidation reactor, said oxidation supplying a second gaseous flow at high temperature comprising $CO_2$, oxygen holders in a reduced state and an excess of thermal power;

activation of said oxygen holders in a reduced state by introducing said oxygen holders in a reduced state and a gaseous flow of activation comprising steam ($H_2O_{steam}$) at high temperature into a activation reactor, said activation supplying oxygen holders in an oxidized state, a third gaseous flow comprising hydrogen ($H_2$) and an excess of thermal power.

2. The process of claim 1 further comprising the use of the thermal power of said second gaseous flow and/or said thermal excess of said oxidation/activation for the production of at least a part of said gaseous flow of activation from water.

3. The process of claim 1 further comprising recovery of at least a part of the $CO_2$ present in the second gaseous flow to constitute at least a part of the gaseous flow of gasification for a following iteration of the gasification, oxidation, and activation steps.

4. The process of claim 1, further comprising recovery of at least a part of the steam ($H_2O_{steam}$) eventually present in the second gaseous flow to constitute at least a part of the gaseous flow of activation.

5. The process of claim 1 further comprising an increase in temperature of the gaseous flow of gasification with at least a part of the excess of thermal power of oxidation of the first gaseous flow by oxygen holders and the activation of said oxygen holders and a part of the excess of thermal power as generated during the gasification to bring said gaseous flow of gasification to the gasification temperature for a following iteration of the gasification, oxidation, and activation steps.

6. The process of claim 1, further comprising recycling by photosynthesis of a part of the $CO_2$ present in the second gaseous flow in a microalga culture bioreactor, said bioreactor supplying a gaseous flow of oxygen ($FO_2$) and carbonaceous biomass.

7. The process of claim 6, further comprising the use of at least a part of the gaseous flow of oxygen in the gasification reactor to gasify the dry carbonaceous raw material.

8. The process of claim 6, further comprising the recovery of at least a part of the carbonaceous biomass for gasification in the gasification reactor.

* * * * *